US010049104B2

(12) United States Patent
Grant et al.

(10) Patent No.: US 10,049,104 B2
(45) Date of Patent: Aug. 14, 2018

(54) MESSAGE MODIFIER RESPONSIVE TO MEETING LOCATION AVAILABILITY

(71) Applicant: INTERNATIONAL BUSINESS MACHINES CORPORATION, Armonk, NY (US)

(72) Inventors: Robert H. Grant, Austin, TX (US); Jeremy A. Greenberger, Raleigh, NC (US); Trudy L. Hewitt, Cary, NC (US); Joseph Lam, Markham (CA)

(73) Assignee: International Business Machines Corporation, Armonk, NY (US)

( * ) Notice: Subject to any disclaimer, the term of this patent is extended or adjusted under 35 U.S.C. 154(b) by 10 days.

(21) Appl. No.: 15/343,362

(22) Filed: Nov. 4, 2016

(65) Prior Publication Data
US 2018/0129645 A1 May 10, 2018

(51) Int. Cl.
| | |
|---|---|
| *G06F 15/16* | (2006.01) |
| *G06F 17/27* | (2006.01) |
| *H04L 12/58* | (2006.01) |
| *H04L 29/08* | (2006.01) |
| *H04L 29/06* | (2006.01) |

(52) U.S. Cl.
CPC ........ *G06F 17/279* (2013.01); *G06F 17/2775* (2013.01); *H04L 51/16* (2013.01); *H04L 51/20* (2013.01); *H04L 67/10* (2013.01); *H04L 67/42* (2013.01)

(58) Field of Classification Search
USPC ........................................................ 709/204
See application file for complete search history.

(56) References Cited

U.S. PATENT DOCUMENTS 7,027,995 B2 4/2006 Kaufman et al.
9,824,333 B2* 11/2017 Shaw .................. G06Q 10/109
(Continued)

FOREIGN PATENT DOCUMENTS

EP 2669858 A1 12/2013

OTHER PUBLICATIONS

Peter Mell et al, The NIST Definition of Cloud Computing, National Institute of Standards and Technology, Publication 800-145, 2011.
(Continued)

*Primary Examiner* — Jude Jean Gilles
(74) *Attorney, Agent, or Firm* — Patrick J. Daughterty; Driggs, Hogg, Daugherty & Del Zoppo Co., LPA

(57) ABSTRACT

Processors are configured to analyze message text content to determine whether the text content proposes a meeting event at a specified location and a specified time. In response to determining that the text content proposes said meeting event, the processor determines whether a meeting is possible at the specified location and the specified time as a function of forum availability. In response to determining that the meeting is possible, the processor generates a confirming appointment message comprising text content that identifies creation of a meeting event at the meeting place at the specified location and at the specified time. In response to determining that the meeting is not possible, the processor creates an alternative meeting proposal message that includes alternative text content, including an alternative, different location or an alternative, different time.

20 Claims, 6 Drawing Sheets

(56) References Cited

U.S. PATENT DOCUMENTS

| | | | |
|---|---|---|---|
| 2003/0217073 A1* | 11/2003 | Walther | G06Q 10/109 |
| 2004/0260780 A1* | 12/2004 | Eisen | G06Q 10/109 |
| | | | 709/207 |
| 2007/0021996 A1* | 1/2007 | Barnard | G06Q 10/06 |
| | | | 705/7.26 |
| 2009/0014516 A1* | 1/2009 | Kshirsagar | G07C 9/00111 |
| | | | 235/382.5 |
| 2009/0222741 A1* | 9/2009 | Shaw | G06Q 10/109 |
| | | | 715/753 |
| 2011/0040599 A1 | 2/2011 | Guruprasad et al. | |
| 2012/0290950 A1* | 11/2012 | Rapaport | H04L 51/32 |
| | | | 715/753 |
| 2013/0124189 A1 | 5/2013 | Baldwin | |
| 2014/0308933 A1 | 10/2014 | Martin et al. | |
| 2016/0103813 A1 | 4/2016 | Liensberger | |

OTHER PUBLICATIONS

Google Maps Help, Search and find nearby places, 2016.

* cited by examiner

MESSAGE MODIFIER RESPONSIVE TO MEETING LOCATION AVAILABILITY

BACKGROUND

Meeting appointments are generated to satisfy a variety of boundary conditions for participants, including appointment time, time span or range of times available for participants to attend a meeting, day or date, geographic location, forum availability, et cetera. Computer-implemented systems may provide assistance in automatically scheduling meetings. Some examples generate and present hypertext entries within the body of emails or other messages to represent dates and times found within text content, wherein selection of the hypertext entries by user triggers the creation of a calendar appointment or event for the user in a calendar application.

BRIEF SUMMARY

In one aspect of the present invention, a computerized method for automatically modifying message content in response to meeting location availability includes executing steps on a computer processor. Thus, a computer processor analyzes text content within an input message to determine whether the text content proposes a meeting event at a specified location and a specified time. In response to determining that the text content proposes a meeting event at a specified location and a specified time, the processor determines whether a meeting is possible at the specified location and the specified time as a function of forum availability. In response to determining that the meeting is possible at the specified location and the specified time as a function of forum availability, the processor generates a confirming appointment message comprising text content that identifies creation of a meeting event at the meeting place at the specified location and at the specified time. In response to determining that the meeting is not possible at the specified location and the specified time as a function of forum availability, the processor creates an alternative meeting proposal message that includes alternative text content (for example, an alternative location that is different from the specified location, or an alternative time that is different from the specified time).

In another aspect, a system has a hardware processor in circuit communication with a computer readable memory and a computer-readable storage medium having program instructions stored thereon. The processor executes the program instructions stored on the computer-readable storage medium via the computer readable memory and thereby analyzes text content within an input message to determine whether the text content proposes a meeting event at a specified location and a specified time. In response to determining that the text content proposes a meeting event at a specified location and a specified time, the processor determines whether a meeting is possible at the specified location and the specified time as a function of forum availability. In response to determining that the meeting is possible at the specified location and the specified time as a function of forum availability, the processor generates a confirming appointment message comprising text content that identifies creation of a meeting event at the meeting place at the specified location and at the specified time. In response to determining that the meeting is not possible at the specified location and the specified time as a function of forum availability, the processor creates an alternative meeting proposal message that includes alternative text content (for example, an alternative location that is different from the specified location, or an alternative time that is different from the specified time).

In another aspect, a computer program product for automatically modifying message content in response to meeting location availability has a computer-readable storage medium with computer readable program code embodied therewith. The computer readable hardware medium is not a transitory signal per se. The computer readable program code includes instructions for execution which cause the processor to analyze text content within an input message to determine whether the text content proposes a meeting event at a specified location and a specified time. In response to determining that the text content proposes a meeting event at a specified location and a specified time, the processor determines whether a meeting is possible at the specified location and the specified time as a function of forum availability. In response to determining that the meeting is possible at the specified location and the specified time as a function of forum availability, the processor generates a confirming appointment message comprising text content that identifies creation of a meeting event at the meeting place at the specified location and at the specified time. In response to determining that the meeting is not possible at the specified location and the specified time as a function of forum availability, the processor creates an alternative meeting proposal message that includes alternative text content (for example, an alternative location that is different from the specified location, or an alternative time that is different from the specified time).

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
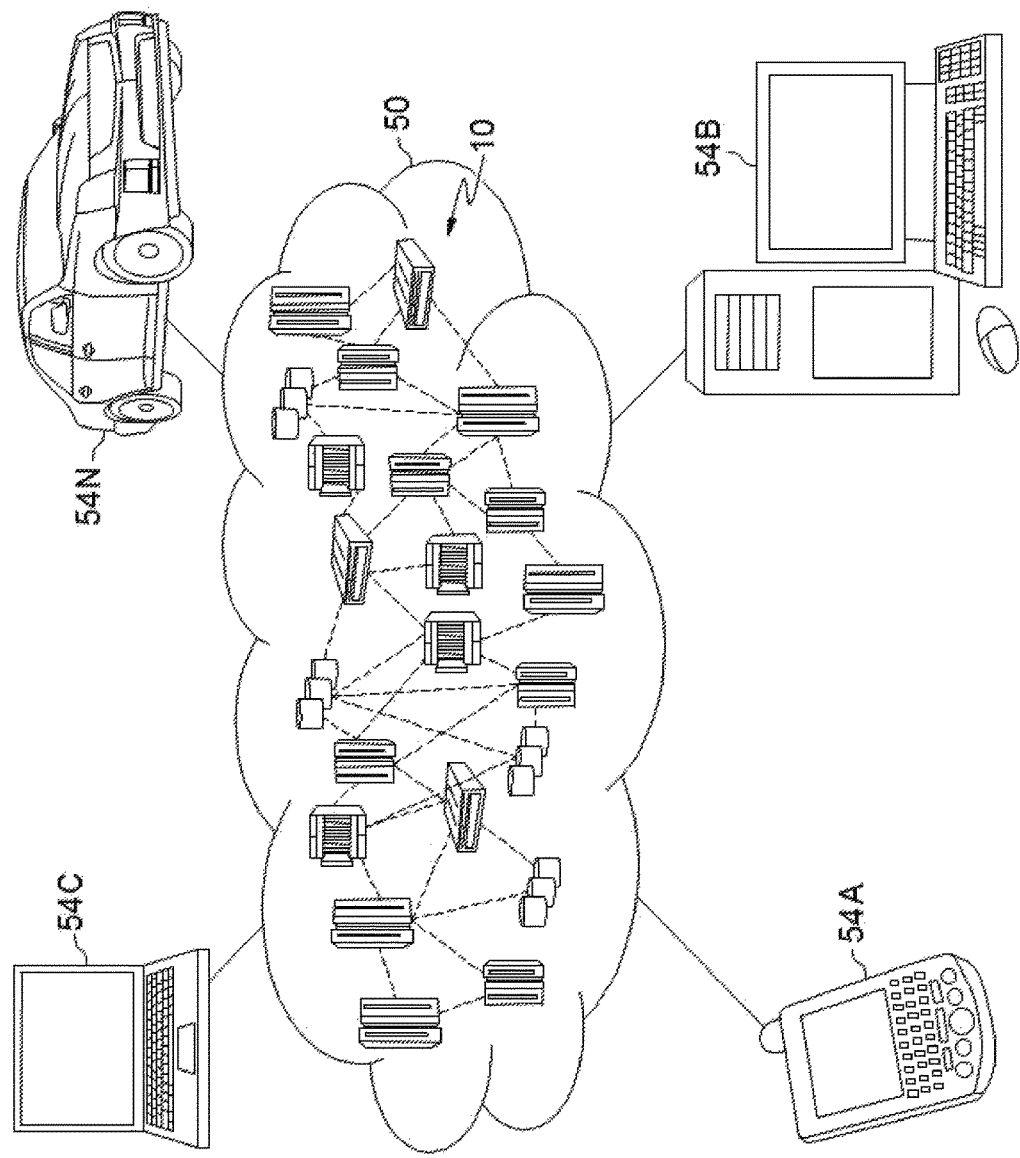
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
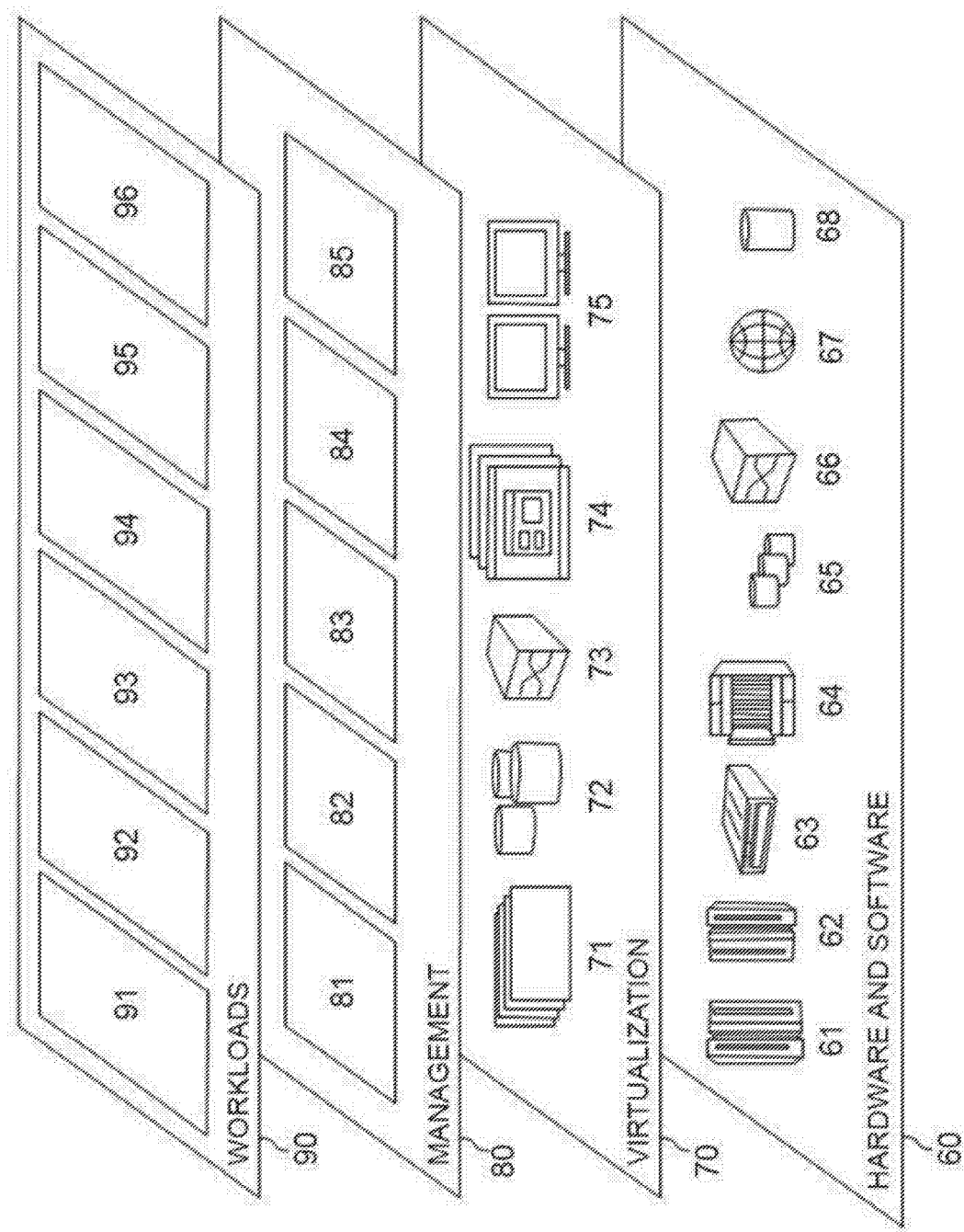
FIG. 2 depicts a cloud computing node according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Figure 4:
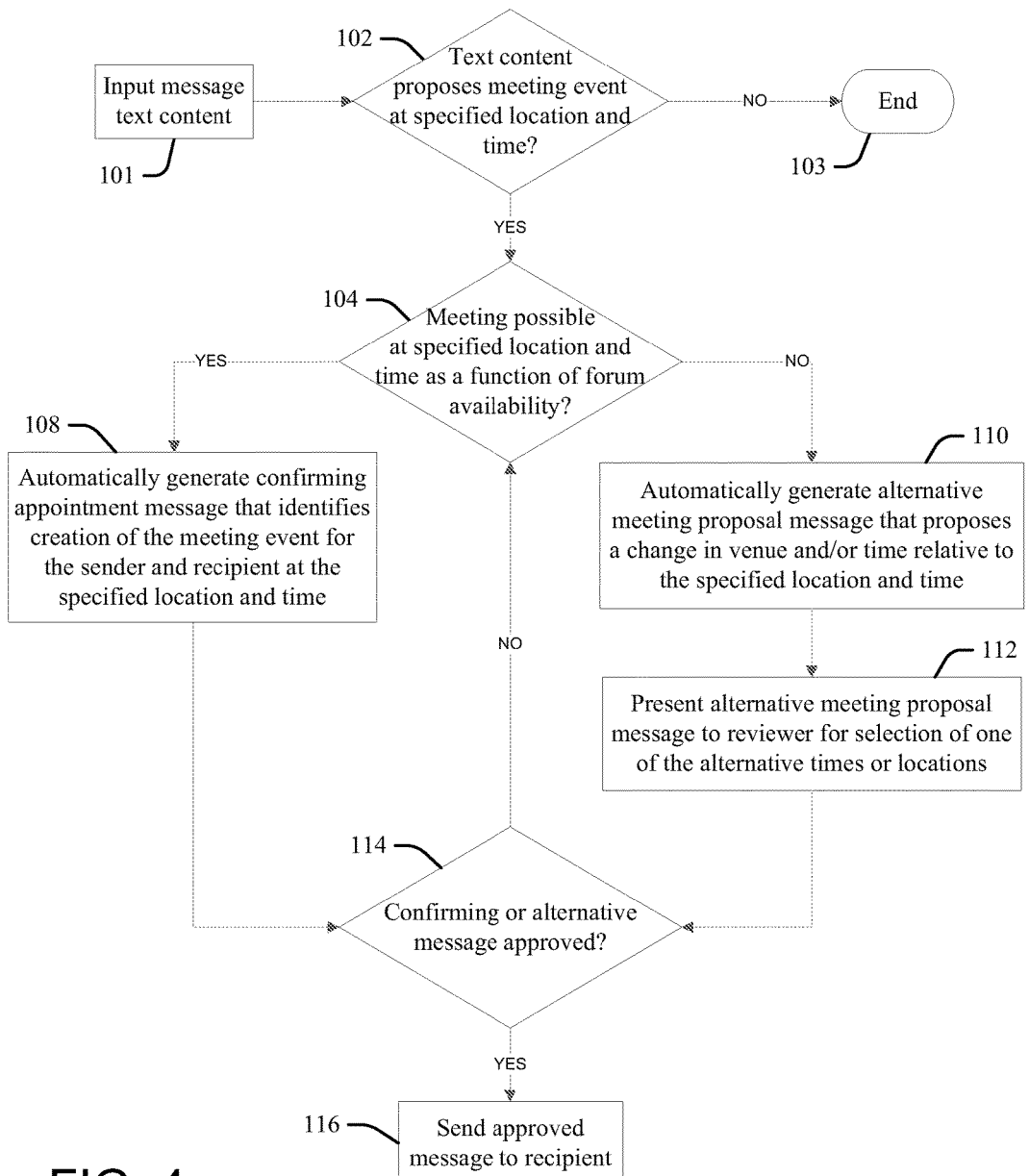
FIG. 4 is a flow chart illustration of an embodiment of the present invention that automatically modifies message content in response to meeting location availability.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing 96 for automatically modifying message content in response to meeting location availability according to embodiments of the present invention, for example to execute the process steps or system components or tasks as depicted in FIG. 4 below.

Figure 3:
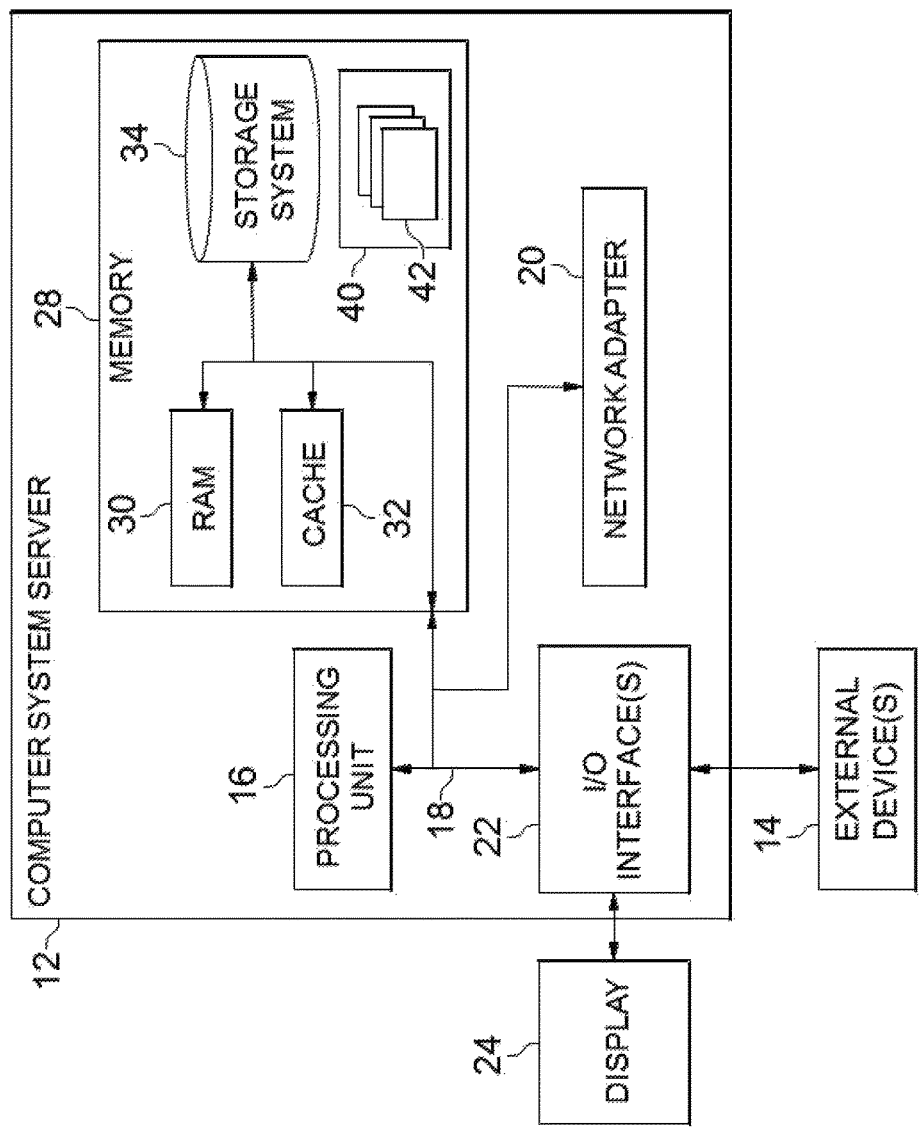
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

FIG. 4 illustrates a process or system according to the present invention that automatically modifies message content in response to meeting location availability. At 102, in response to an input of a message 101 having text content that is generated by a sender (sometimes herein a "first user") for transmission to a recipient of the message (some other, different, "second user" person), a processor that is configured according to an aspect of the present invention (the "configured processor") analyzes the text content within the message input 101 to determine whether the text content proposes (suggests, requests, etc.) setting up a meeting event at a specified location and time, which may include a meeting to be attended by the sender and recipient. The configured processor may be implemented in accordance with the computer system server 10 of FIG. 3, including as the cloud node 10 of FIG. 1, as described respectively above.

In aspects of the present invention the configured processor may function as a cognitive monitor that passively examines text content of all message inputs from the sender to identify message body text content conversation items that propose meetings at some specified location or type of location, at some specified time or range of possible times. Some examples of the configured processor use natural language classification to detect, identify or otherwise distinguish messages that propose meetings with the recipient from other messages or message content, and responsively initiate an extraction process to identify specified location and time components of the meeting proposals messages or contents thereof.

If determined that the text content does not proposes setting up a meeting event at a specified location and time, then the present inquiry process ends at 103. Otherwise, at 104 the configured processor determines whether the meeting is possible at the specified location at the specified time as a function of forum availability. For example, the configured processor determines whether the specified time is within business days and hours of operation of a meeting facility, restaurant, movie theater, coffee shop or other assembly forum, and therefore whether use of the forum as a meeting place at the location is possible; matches reservation times remaining and available at a restaurant forum, thereby determining whether a dining reservation meeting is possible at the restaurant; matches or otherwise correlates the specified time with performance times of movie showings, sporting events or concert performances at a theater or other assembly forum, and further for which admission tickets are remaining and available for purchase, thereby determining whether a proposed meeting to attend a performance at the forum is possible (enabled) by the ability of sender and recipient to gain ticketed admission to the particular forum at the location; and still others will be apparent to one skilled in the art.

At 108, in response to determining that a meeting is possible at the specified location and time as a function of forum availability, the configured processor automatically generates a confirming appointment message that identifies creation of the meeting event for the sender and recipient at forum or meeting place identified at the specified location, at the specified time.

In response to determining that a meeting is not possible at the specified location and time as a function of forum availability, at 110 the configured processor automatically creates an alternative meeting proposal message that proposes a change in venue (meeting place or location) and/or time relative to the location and time specified in the meeting proposal message. For example, the configured processor may determine that a specified restaurant does not have reservations available for the specified time, and in response propose one or more alternative times that are available, or an alternative restaurant that does have reservations available for the specified time.

If the alternative message comprises a plurality of different, alternative times of location, at 112 the configured processor drives a graphic display to present the alternative message to a reviewer (the creating sender or an indicated recipient of the message) for selection of one of the alternative times or locations.

At 114 the configured processor drives a graphic display to present the confirming message or the alternative message (as revised with location or time field data populated in response to any selection by the reviewer at 112) to a reviewer (generally the originator or sender of the input message) for review and approval, and if approved sends the approved message to the recipient as a message from the sender (originator of the input message) at 116.

Otherwise, if the reviewed message is not approved at 114, the process returns to step 104 to repeat again determine if a meeting possible at a current specified location and time (including as selected or otherwise revised by the reviewer at 112). Thus, alternative meeting locations and times may be iteratively generated as a function of forum availability, and reviewed and accepted or declined by the reviewer until the reviewer is satisfied and the configured processor forwards the message to the recipient.

In some embodiments, the configured processor automatically sends the confirming or alternative message to both sender and recipient at 116, omitting the conditional review and approval by the reviewer at 114.

Selecting and presenting alternative locations or times at 110 and 112 may be in response to sender or recipient preferences. For example, the configured processor may select alternative times from a range of historical dining reservation times accepted by the sender or recipient. Alternative locations may be selected from groups of alternatives that share type or category data with the specified location (for example, other theaters showings the same movie or type or genre of movie, other restaurants that serve a same type of cuisine, etc.). Alternative times may be generated as aggregations or sets of nearest (in time) available times for the specified location.

Figure 5:
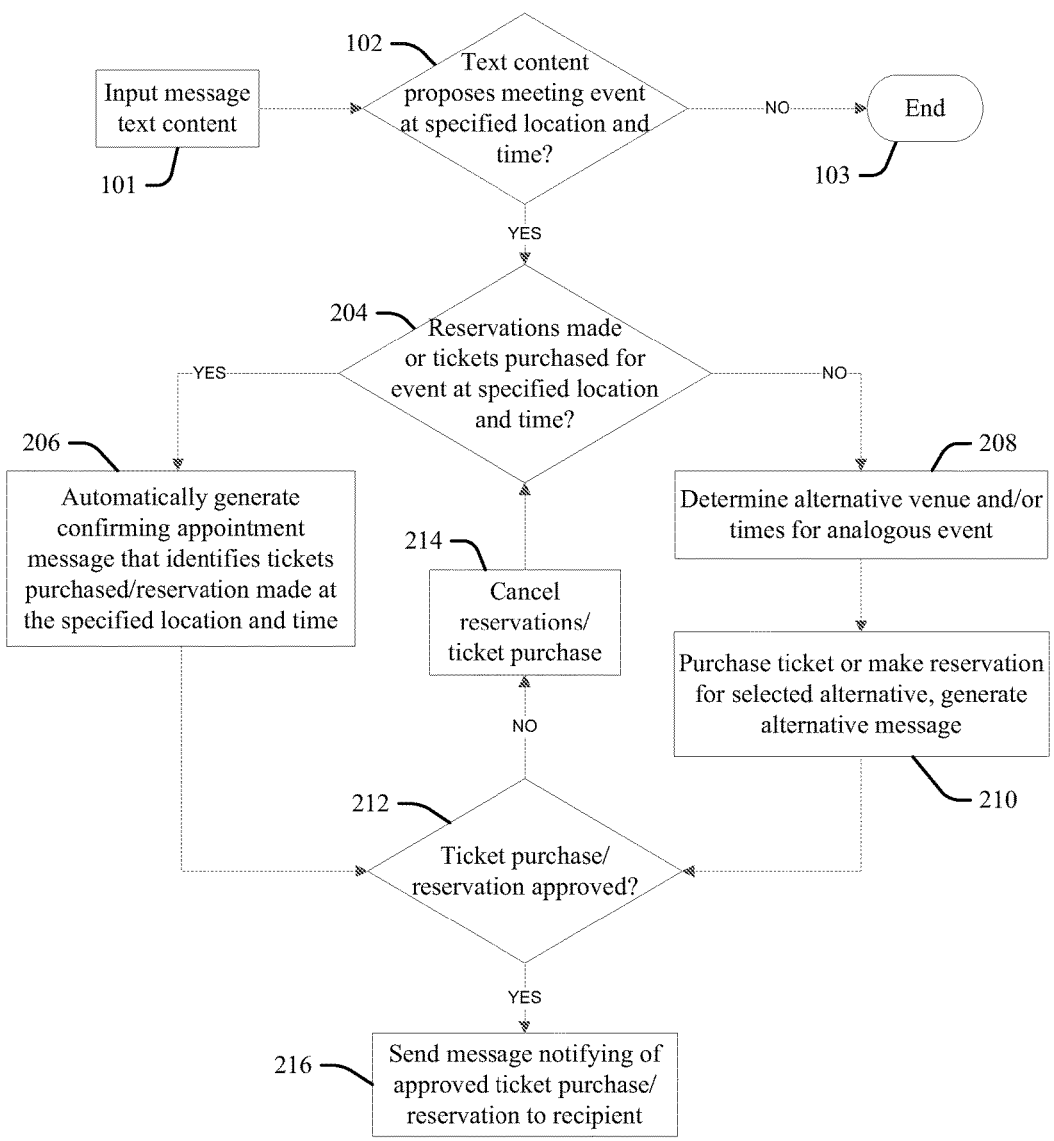
FIG. 5 is a flow chart illustration of another embodiment of the present invention that automatically modifies message content in response to meeting location availability.

FIG. 5 illustrates another, alternative embodiment of the present invention. In response to determining at 102 that an input message text content (101) proposes setting up a meeting event at a specified location and time, at 204 a configured processor attempts to purchase admission tickets or make a dining reservation for the specified location and time as a function of identifying the forum type and event nature of the meeting proposal. For example, the configured processor determines that the meeting proposal is a performance time of a movie showing, sporting event or concert performance at a theater or other assembly forum of the specified location, or is a dinner date at a restaurant at the specified location that accepts time-specific reservations. Accordingly, at 204 the configured processor automatically attempts to reserve a table at the restaurant or purchase a pair of tickets for the sender and recipient at the specified time. If successful at 204, at 206 the configured processor generates a confirming appointment message that identifies the tickets purchased or reservation made.

If the attempt to reserve a table at the restaurant or purchase a pair of tickets is not successful at 204 (including due to no availability), at 208 the configured processor identifies or determines possible alternatives (change in venue and/or time relative to the location and time specified in the meeting proposal message, as discussed above), and at 210 reserves a table at a restaurant or purchases tickets for one of the possible alternatives, including for one selected by a reviewing originator of the input message where multiple alternatives are identified at 208, and generates an alternative message with text content identifying the alternative forum or times of the purchased tickets or made reservation.

At 212 the configured processor drives a graphic display to present the confirming message or the alternative message to a reviewer (generally the originator or sender of the input message) for review and approval, and if approved sends the approved message to the recipient as a message from the sender (originator of the input message) at 216.

Otherwise, if the reviewed message is not approved at 212, the configured processor cancels the ticket purchase or table reservation at 214, and the process returns to step 204. Thus, alternative table reservation or ticket purchases are iteratively executed and subsequently cancelled until the reviewer is satisfied and the configured processor forwards the message to the recipient at 216.

Selecting and purchasing alternative performance tickets or making alternative reservations may be in response to sender or recipient preferences, for example from a range of historical dining reservation times accepted by the sender or recipient, theaters attended, movie genres preferred, etc.

Figure 6:
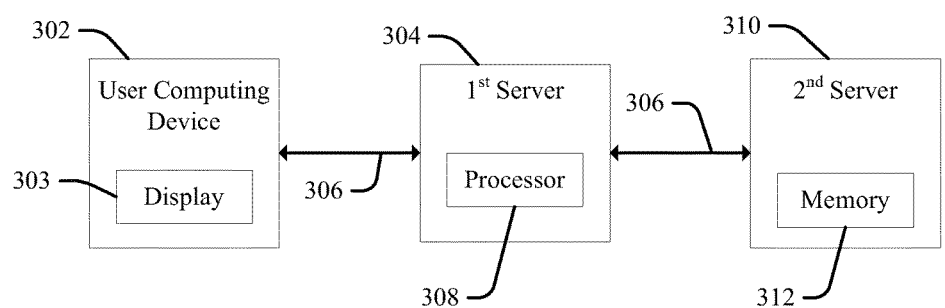
FIG. 6 depicts a network environment according to an embodiment of the present invention.

FIG. 6 illustrates a network environment wherein a smart phone of a user or other computing device 302 receives an input of user text message from a user via a user interface. A first network server 304 in communication with the computing device 302 via a network infrastructure or environment 306 receives the text message input from the device 302. The computing device 302 and first server 304 may include internal and external hardware components, as depicted and described in further detail above with reference to FIG. 3. In some embodiments the network infrastructure or environment 306 is implemented in a cloud computing network environment, for example the cloud computing network environment 50 of FIG. 1 as described above.

An application executing on a processor (processing unit) 308 of the first server 304 is configured according to the present invention to analyze text content within the input message to determine whether the text content proposes a meeting event at a specified location and time, and make a call or query to a second network server 310 in communication with the first network server 304 via the network infrastructure 306 to determine from databases stored in memory 312 thereon whether a proposed meeting is possible at the specified location at the specified time as a function of forum availability, for example via processes or methods illustrated in FIG. 4 and described above. The configured processor 308 thereby generates a confirming appointment message that identifies creation of a meeting event at a forum identified at the specified location and time, or creates an alternative meeting proposal message proposing a change in venue or time, and sends the messages to the smart phone 302 for display to the user on a display screen 303.

In some embodiments the configured processor 308 makes calls to the second server 310 to attempt to purchase admission tickets or make reservations for the specified location and time, or to identifies possible alternatives in venue or time, for example via processes or methods illustrated in FIG. 5 and described above.

Processors configured according to aspects of the present invention may determine meeting places, alternative showings and forums, etc., by making external calls to databases for available times for a particular location, which are compared to a specified time in an input message from a user. Nearest times may be aggregated and displayed to a user for selection within a message application conversation platform. Over time aspects may associate speech patterns with location data (for example, global positioning satellite (GPS) data) to provide accurate identifications and classifications of potential meeting times and locations, as well as to provide initial data for use in generating confirming or alternative messages.

Coordinating meeting times may be difficult in prior art systems and methods. Difficulties in verifying or ensuring that a recipient of message proposing a meeting is available at a desired time, or that a proposed meeting place is available, may require the exchange of multiple messages. Mistakes, miscommunications or misunderstandings from message to message may result incorrect or inappropriate time or location arrangements. In contrast, aspects of the present invention use cognitive processing to make sure that the meeting times and locations are available, to thereby ensure that the meeting outputs are relevant and correct.

For example, consider an organizer desiring to make a reservation for two at 5 p.m. at a certain restaurant to celebrate an occasion with another person. Under the prior art the organizer must exchange a series of different messages with the other person to convey his or her intention (to celebrate the event at the restaurant at 5 p.m.); to verify with the other person that the proposed time is good; to check through another message exchange with the restaurant, or by using a restaurant reservation request application, to see if the reservation is possible at that time, and to make a reservation at the desired or other available time, or at another restaurant that has availability at the desired time. If a restaurant is popular it may provide limited reservation capacity, and thus likely for the requested time to be unavailable. If the organizer is forced to choose another time, or another restaurant for the desired time, then the organizer must engage in another messaging exchange with the other person to confirm that they can meet at the revised time, or at a revised location, relative to the previous message exchange.

In contrast, aspects of the present invention may passively monitor the organizer's message text content to identify such appointment proposals and automatically, and prior to sending the proposal message to the other person, determine proposed times and locations from the message content, determine whether the time/location pairing can be achieved, and if yes, updates the text content to indicate that the meeting or appointment is set, and if not, provide the organizer with a list of possible alternatives.

Thus, in one example a first user (sender) generates the following text message to send to their spouse (recipient): "let's book a reservation at Beasley's tonight 5 pm." A processor configured by an aspect of the present invention analyzes the text content of the message to determine recognize that the text content phrase "lets book a reservation" is a meeting proposal for the sender and recipient; that the text content provides a specified day and time ("tonight 5 pm") at a specified location (identified as text content following the word "at," and wherein searching user histories and database resources determining that "Beasley's" is the name of restaurant having a certain street address location.

In response to determining that Beasley's is a restaurant, prior to sending the message to the recipient, the configured processor dynamically initiates actions to attempt to make reservations for a table for two at Beasley's at the specified day and time. It will be apparent that the size of the reservation may be established by the total number of message sender and recipients, so that a group text to additional recipients will increment the party number used to secure the reservation, or to otherwise determine the availability.

Thus, in response to determining that a reservation is available at the specified time and location, the configured processor dynamically changes the message text content from the sender to "I booked reservations at Beasley's tonight 5 pm," prior to sending the message to the recipient, thereby notifying both sender and recipient of the availability of the proposed meeting location and time. The configured processor may also allow for the sender to review the changed text prior to sending to the recipient.

Otherwise, in response to determining that the reservations are not available at the specified time and location, the configured processor dynamically changes the message text content from the sender to "I booked reservations at Beasley's for (6 pm) (7 pm) tonight," thereby displaying two other possible times that differ from the specified time but wherein the meeting place is available for the sender and recipient to meet for dinner. This may be displayed to the sender as originator of the message to choose one of the alternate times prior to sending to the recipient, wherein the configured processor again revises the text content to indicate the chosen time prior to sending to the recipient; or it may be sent to the recipient, allowing the recipient to make the choice between the alternative times.

The configured processor may also look for alternate locations that can support the same or similar proposed meeting at the specified time. For example, in response to determining that "Beasly's" is not available at 5 pm, or at 6 pm or 7 pm or any other alternative time indicated as within an acceptable range of time (by user preferences or dining history) the configured processor may search for availability at the specified time (or within a permissible range of the specified time) at other restaurants that have acceptable ratings, similar cuisine, historical dining experiences, etc.

The configured processor may automatically make the restaurant reservation on behalf of the originator and recipient, including while confirming availability (such as through a reservation booking application), and then subsequently cancelling the reservation if the recipient or originator fail to approve or confirm the reservation, or it may make the reservation in response to confirmation from the originator or recipient.

In another example an originator/sender generates a text message to a friend with the following text content: "let's meet at the Westdale Mall at 10 am." The configured processor monitor determines that the text content proposes a meeting time for today (defaulting to a current day if no other day or date is indicated) at 10 am at the location of the "Westdale Mall." The configured processor identifies the "Westdale Mall" as business name and dynamically retrieves the operating hours for the business. In response to determining that the proposed time falls within the business operating hours (thus, that is open and available for use as a meeting forum) the text content of the message is forwarded unchanged to the recipient. Otherwise, in response to determining that the proposed time falls outside of the business operating hours, as the mall does not open until 12 pm, the configured processor dynamically changes the message text content to "let's meet at the Westdale Mall at 12 pm," and notifies the originator of the change for confirmation that the revised time is acceptable to the originator prior to sending the revised message to the recipient.

In another example an originator/sender generates a text message to a friend to suggest seeing a move together, with the following text content: "let's go catch The Huntsman: Winter's War at Richmond-AMC tonight at 8 pm." Prior to delivering the message, the configured processor determines, as a function of the context of the remaining text content, that that the phrase "let's go catch" conveys a proposal to see a movie entitled "The Huntsman: Winter's War" at a movie theater uniquely identified as the "Richmond AMC." In response, the configured processor dynamically retrieves showing hours and seat availability for showings at the "Richmond AMC" movie theater of all movies matching the title terms "The Huntsman: Winter's War." In response to determining that tickets are available for the proposed showing, the configured processor changes the text content to "I made reservations to watch The Huntsman: Winter's War at AMC tonight at 8 pm," wherein the configured processor may present the changed text to the originator to thereby notify the originator that tickets are available, and to otherwise review and approve the changed text prior to delivery to the recipient. Otherwise, in response to determining that tickets are not available for the proposed showing, the configured processor changes the text content to "let's go watch The Huntsman: Winter's War at AMC tonight at 11 pm," and displays said revised text to the originator, thereby notifying the originator that tickets are not available at the desired time but that they are available at the later time, and also enabling the originator to approve the later time selection prior to delivery to the recipient.

The configured processor may also consider traffic, weather, travel distances from originator and recipient locations and other factors in determining whether the sender or recipient may probably arrive at the specified location at the specified time, or in determining possible alternative times. For example, in response to determining that a projected travel time for the originator or recipient to the meeting place from their place of employment exceeds a difference in time from the end of their work day to the specified meeting time, including as a function of current or projected traffic or weather conditions, the configured processor changes the input message text content to propose one or more alternative times that enable said originator or recipient to arrive timely at the proposed meeting place.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for automatically modifying message content in response to meeting location availability, comprising executing on a computer processor the steps of:
   analyzing text content within an input message to determine whether the text content proposes a meeting event at a specified location and a specified time;
   in response to determining that the text content proposes a meeting event at a specified location and a specified time, determining whether a meeting is possible at the specified location and the specified time as a function of forum availability;
   in response to determining that the meeting is possible at the specified location and the specified time as a function of forum availability, generating a confirming appointment message comprising text content that identifies creation of a meeting event at a meeting place at the specified location and at the specified time; and
   in response to determining that the meeting is not is possible at the specified location and the specified time as a function of forum availability, creating an alternative meeting proposal message comprising alternative text content that that is selected from the group consisting of an alternative location that is different from the specified location and an alternative time that is different from the specified time.

2. The method of claim 1, further comprising:
   in response to creating the alternative meeting proposal message, sending the alternative meeting proposal message to a reviewer for approval of the alternative text content, wherein the reviewer is selected from the group consisting of an originating sender of the input message and an indicated recipient of the input message; and
   in response to an approval by the reviewer of the alternative text content, generating the alternative meeting proposal message to comprise text content that identifies creation of a meeting event at a meeting place at a specified location and at a specified time of the alternative text content.

3. The method of claim 1, wherein the step of determining whether the meeting is possible at the specified location and the specified time as a function of forum availability is selected from the group consisting of determining whether the specified time is within business days and hours of operation of the meeting place, matching the specified time to reservation times available at a restaurant meeting place, and correlating the specified time to a performance time of an event for which an admission ticket is available for purchase.

4. The method of claim 2, wherein the generated alternative meeting proposal message text content comprises a plurality of different alternatives that are selected from a plurality of different locations and a plurality of different specified times; and
   wherein the approval by the reviewer of the alternative text content comprises a selection of one of the plurality of different alternatives.

5. The method of claim 1, further comprising:
   automatically reserving a meeting place at a time indicated by text content of a generated one of the alternative meeting proposal message and the confirming appointment message, wherein the step of reserving the meeting place is selected from the group consisting of reserving a table at a restaurant and purchasing an admittance ticket for an event.

6. The method of claim 2, wherein the step of determining whether the meeting place at the specified location has availability as a function of the specified time further comprises:
   determining a projected travel time for a travelling one of the originating sender and the indicated recipient to travel to the specified location from a current location; and
   in response to determining that the projected travel time exceeds an elapsed time from a projected departure time to the specified time, selecting the alternative time for the alternative text content so that the projected travel time does not exceed an elapsed time from the projected departure time to the selected the alternative time.

7. The method of claim 6, further comprising:
   determining the projected travel time as a function of a travel condition selected from the group consisting of traffic and weather conditions.

8. The method of claim 1, further comprising:
   integrating computer-readable program code into a computer system comprising a processor, a computer readable memory in circuit communication with the processor, and a computer readable storage medium in circuit communication with the processor; and
   wherein the processor executes program code instructions stored on the computer-readable storage medium via the computer readable memory and thereby performs the steps of analyzing the text content within the input message to determine whether the text content proposes a meeting event at a specified location and a specified time, determining whether a meeting is possible at the specified location and the specified time as a function of forum availability in response to determining that the text content proposes a meeting event at a specified location and a specified time, generating a confirming appointment message comprising text content that identifies creation of a meeting event at the meeting place at the specified location and at the specified time in response to determining that the meeting is possible at the specified location and the specified time as a function of forum availability, and creating an alternative meeting proposal message comprising alternative text content that that is selected from the group consisting of an alternative location that is different from the specified location and an alternative time that is different from the specified time.

9. The method of claim 8, wherein the computer-readable program code is provided as a service in a cloud environment.

10. A system, comprising:
    a processor;
    a computer readable memory in circuit communication with the processor; and
    a computer readable storage medium in circuit communication with the processor;
    wherein the processor executes program instructions stored on the computer-readable storage medium via the computer readable memory and thereby:

analyzes text content within an input message to determine whether the text content proposes a meeting event at a specified location and a specified time;

in response to determining that the text content proposes a meeting event at a specified location and a specified time, determines whether a meeting is possible at the specified location and the specified time as a function of forum availability;

in response to determining that the meeting is possible at the specified location and the specified time as a function of forum availability, generates a confirming appointment message comprising text content that identifies creation of a meeting event at a meeting place at the specified location and at the specified time; and in response to determining that the meeting is not possible at the specified location and the specified time as a function of forum availability, creates an alternative meeting proposal message comprising alternative text content that that is selected from the group consisting of an alternative location that is different from the specified location and an alternative time that is different from the specified time.

11. The system of claim 10, wherein the processor executes the program instructions stored on the computer-readable storage medium via the computer readable memory and thereby further:

in response to creating the alternative meeting proposal message, sends the alternative meeting proposal message to a reviewer for approval of the alternative text content, wherein the reviewer is selected from the group consisting of an originating sender of the input message and an indicated recipient of the input message; and in response to an approval by the reviewer of the alternative text content, generates the alternative meeting proposal message to comprise text content that identifies creation of a meeting event at a meeting place at a specified location and at a specified time of the alternative text content.

12. The system of claim 10, wherein the processor executes the program instructions stored on the computer-readable storage medium via the computer readable memory and thereby determines whether the meeting is possible at the specified location and the specified time as a function of forum availability in a process selected from the group consisting of determining whether the specified time is within business days and hours of operation of the meeting place, matching the specified time to reservation times available at a restaurant meeting place, and correlating the specified time to a performance time of an event for which an admission ticket is available for purchase.

13. The system of claim 11, wherein the processor executes the program instructions stored on the computer-readable storage medium via the computer readable memory and thereby generates the alternative meeting proposal message text content to comprise a plurality of different alternatives that are selected from a plurality of different locations and a plurality of different specified times; and wherein the approval by the reviewer of the alternative text content comprises a selection of one of the plurality of different alternatives.

14. The system of claim 10, wherein the processor executes the program instructions stored on the computer-readable storage medium via the computer readable memory and thereby further:

automatically reserves a meeting place at a time indicated by text content of a generated one of the alternative meeting proposal message and the confirming appointment message, wherein the step of reserving the meeting place is selected from the group consisting of reserving a table at a restaurant and purchasing an admittance ticket for an event.

15. The system of claim 11, wherein the processor executes the program instructions stored on the computer-readable storage medium via the computer readable memory and thereby determines whether the meeting place at the specified location has availability as a function of the specified time further by:

determining a projected travel time for a one of the originating sender and the indicated recipient to travel to the specified location from a current location; and in response to determining that the projected travel time exceeds an elapsed time from a projected departure time to the specified time, selecting the alternative time for the alternative text content so that the projected travel time does not exceed an elapsed time from the projected departure time to the selected the alternative time.

16. A computer program product for automatically modifying message content in response to meeting location availability, the computer program product comprising:

a computer readable storage medium having computer readable program code embodied therewith, wherein the computer readable storage medium is not a transitory signal per se, the computer readable program code comprising instructions for execution by a processor that cause the processor to:

analyze text content within an input message to determine whether the text content proposes a meeting event at a specified location and a specified time;

in response to determining that the text content proposes a meeting event at a specified location and a specified time, determine whether a meeting is possible at the specified location and the specified time as a function of forum availability;

in response to determining that the meeting is possible at the specified location and the specified time as a function of forum availability, generate a confirming appointment message comprising text content that identifies creation of a meeting event at a meeting place at the specified location and at the specified time; and in response to determining that the meeting is not possible at the specified location and the specified time as a function of forum availability, create an alternative meeting proposal message comprising alternative text content that that is selected from the group consisting of an alternative location that is different from the specified location and an alternative time that is different from the specified time.

17. The computer program product of claim 16, wherein the computer readable program code instructions for execution by the processor further cause the processor to:

in response to creating the alternative meeting proposal message, send the alternative meeting proposal message to a reviewer for approval of the alternative text content, wherein the reviewer is selected from the group consisting of an originating sender of the input message and an indicated recipient of the input message; and in response to an approval by the reviewer of the alternative text content, generate the alternative meeting proposal message to comprise text content that identifies creation of a meeting event at a meeting place at a specified location and at a specified time of the alternative text content.

18. The computer program product of claim 16, wherein the computer readable program code instructions for execution by the processor further cause the processor to determine whether the meeting is possible at the specified location and the specified time as a function of forum availability in a process selected from the group consisting of determining whether the specified time is within business days and hours of operation of the meeting place, matching the specified time to reservation times available at a restaurant meeting place, and correlating the specified time to a performance time of an event for which an admission ticket is available for purchase.

19. The computer program product of claim 17, wherein the computer readable program code instructions for execution by the processor further cause the processor to generate the alternative meeting proposal message text content to comprise a plurality of different alternatives that are selected from a plurality of different locations and a plurality of different specified times; and wherein the approval by the reviewer of the alternative text content comprises a selection of one of the plurality of different alternatives.

20. The computer program product of claim 16, wherein the computer readable program code instructions for execution by the processor further cause the processor to:

automatically reserve a meeting place at a time indicated by text content of a generated one of the alternative meeting proposal message and the confirming appointment message, wherein the step of reserving the meeting place is selected from the group consisting of reserving a table at a restaurant and purchasing an admittance ticket for an event.

\* \* \* \* \*